United States Patent [19]
Chen

[11] Patent Number: 6,047,033
[45] Date of Patent: Apr. 4, 2000

[54] APPARATUS AND METHOD FOR SIGNAL TIMING ERROR DETECTION

[75] Inventor: Weizhong Chen, Keller, Tex.

[73] Assignee: Motorola, Inc., Schaumburg, Ill.

[21] Appl. No.: 08/858,257

[22] Filed: May 19, 1997

[51] Int. Cl.$^7$ .................................................. H04L 27/14
[52] U.S. Cl. .......................... 375/326; 375/343; 375/354
[58] Field of Search ..................... 375/326, 342, 375/343, 344, 345, 362, 368, 371, 354, 355; 370/503, 516

[56] References Cited

U.S. PATENT DOCUMENTS

| | | | |
|---|---|---|---|
| 4,439,765 | 3/1984 | Wilmot | 342/58 |
| 5,012,491 | 4/1991 | Iwasaki | 375/343 |
| 5,272,446 | 12/1993 | Chalmers et al. | 329/304 |
| 5,276,706 | 1/1994 | Critchlow | 375/343 |
| 5,282,228 | 1/1994 | Scott et al. | 375/344 |
| 5,285,482 | 2/1994 | Sehier et al. | 375/355 |
| 5,309,482 | 5/1994 | Wright et al. | 375/350 |

*Primary Examiner*—Don N. Vo
*Attorney, Agent, or Firm*—Charles W. Bethards

[57] ABSTRACT

Apparatus in a receiver (109) and analogous method for detecting or acquiring a timing reference or error for a data signal, including a receiver front end (201) for receiving a sequence of symbols, and a signal processor (218) programmed to correlate, using a recursive procedure, the sequence of symbols to a predetermined sequence of symbols to provide a correlated magnitude corresponding to a timing error (212) and then adjust a timing reference in accordance with the timing error.

16 Claims, 10 Drawing Sheets

APPARATUS AND METHOD FOR SIGNAL TIMING ERROR DETECTION

FIELD OF THE INVENTION

The instant invention deals with receivers and more particularly improved apparatus and methods, used in such receivers, for detecting a timing error or acquiring a timing reference in a signal.

BACKGROUND OF THE INVENTION

Generally receivers are well known and widely used particularly in wireless communications systems such as certain selective messaging systems. Many current selective message systems employ digital modulation techniques to facilitate conveyance of information over the communication media or channel. This together with more capable digital signal processors (DSPs) have popularized various digital processing techniques now used by practitioners to perform various receiver or system sub-functions, such as timing or frequency synchronization or symbol recovery associated with receiving information. In particular recovery of digital modulation normally requires that the receiving end or receiver of a message have a timing reference or clock that is closely aligned with the clock or timing reference at the transmitting end.

Often practitioners resort to sampled data receivers where the incoming signal is digitized and thereafter, using DSPs, digitally processed to eventually yield a detected symbol. This digital processing may be very complex and practitioner routinely search for more efficient approaches for digital processing. For example symbol recovery may well require some form of Fourier Transform or more specifically some form of Fourier transform suitable for sampled data. Such Fourier transforms include a discrete time Fourier transform (DTFT) that exists for any frequencies less that the sampling frequency and the discrete Fourier transform (DFT) which exists only at N discrete equally spaced frequencies where N is the number of samples used to determine the DFT. A fast Fourier transform (FFT) is a fast or efficient algorithm for finding a DFT and is one known approach for limiting processing resource requirements.

Various relatively well known approaches exist to determine the DTFT or DFT. Which transform is needed will depend on the requisites for the transform. For example to find a Fourier transform at an arbitrary frequency requires a DTFT as it is the only one of the above transforms that exists for all frequencies. This is unfortunate as the known DTFT approaches are relatively calculation intensive and therefore may require relatively capable DSPs or the like. This capability entails significant disadvantages such as processor costs or calculation time and power consumption which may be an issue in portable receiver applications. Further known approaches for determining a DTFT may require a processor with extended dynamic range further exasperating the economic burdens. Similarly determining an accurate timing reference may be a complex processing task, requiring, for example, the calculation of a correlation or cross correlation. Because of the complexity involved and limited processing resources practitioners have not used a correlation for timing error detection or timing acquisition, choosing instead some less processing intensive approach that may be less accurate. At higher symbol speeds this lack of accuracy and the resultant reduction in receiver sensitivity becomes much more of a problem. For these reasons timing recovery or error detection has tended to be less accurate or more complex than is ordinarily desirable. Clearly a need exists for an apparatus and method for timing recovery or timing error detection in a receiver that is accurate and processing resource efficient.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
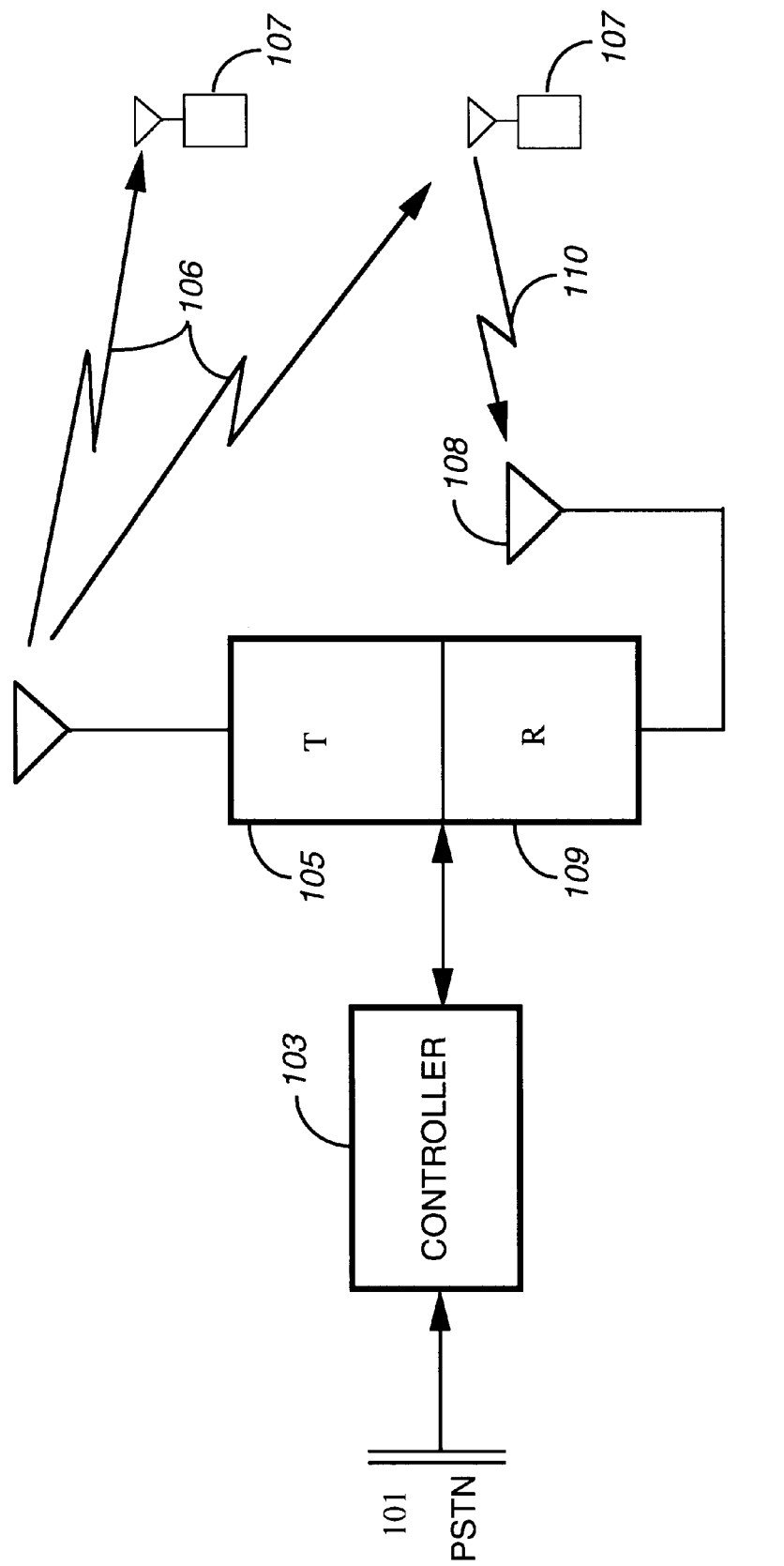
FIG. 1 is a block diagram of a selective messaging system suitable for employing an embodiment of the instant invention.

The present invention deals with a receiver and analogous methods, preferably selective messaging receiver, that is arranged and constructed to receive a signal or recover a message using a noncoherent matched filter structures or principles. This receiver further embodies a signal processor used respectively, for determining and correcting for a frequency error or performing frequency acquisition, then for determining and correcting for a timing error or performing timing acquisition and then as a symbol detector for determining or selecting a symbol or detected symbol. This receiver uses particularly inventive and efficient principles including processor and processing efficient techniques for determining a discrete time Fourier transform (DTFT) and correlations associated with detecting the timing error.

More specifically the receiver, and analogous methods functionally, includes a frequency detector arranged to process a first portion of the signal to provide a frequency error or frequency reference, a timing detector, responsive to the frequency error, arranged to process a second portion of the signal to provide a timing error or tiring reference, and a symbol detector, responsive to the frequency error and the timing error, arranged to process a symbol portion of the signal to provide a detected symbol. Preferably the receiver further includes a signal sampler for providing a sequence of samples corresponding to the signal or message and the frequency detector preferably further includes a signal processor operating as a recursive structure on the sequence of samples to provide a plurality of discrete time Fourier transform (DTFT) signals, the plurality of DTFT signals corresponding to the frequency error by preferably for example a largest magnitude DTFT being representative of this frequency error.

Also preferably the symbol detector further includes a signal processor operating as a recursive structure on the sequence of samples to provide a discrete time Fourier transform (DTFT) signal, the DTFT signal proportional to a DTFT evaluated at a frequency corresponding to the detected symbol. In particular the frequency detector or acquisition operation or function and the symbol detector preferably use very similar techniques discussed in further detail below in conjunction with a detailed description of the symbol detector. Further, preferably, said timing detector further includes a signal processor operating as a recursive structure to correlate a sequence of symbol samples corresponding to a predetermined number of symbols of the :signal with a known sequence of symbol or signal samples to provide a plurality of correlation magnitudes, said plurality of correlation magnitudes corresponding to said timing error.

Further disclosed is a method in a receiver for detecting a timing error for a data signal, including the steps of: receiving a sequence of symbols; correlating, using a recursive procedure, the sequence of symbols to a predetermined sequence of symbols to provide a correlated magnitude corresponding to a timing error; and adjusting a timing reference in accordance with this timing error. The method of further includes a step of sampling the sequence of symbols to provide a sequence of symbol samples corresponding to a first symbol, a second symbol and a third symbol, each symbol being M samples in duration and wherein the step of correlating is performed between the sequence of symbol samples and a predetermined sequence of symbol samples.

Correlating further includes a step of forming an A difference between a current sample and a sample N sample times earlier where N is 3M sample times and operating in a recursive fashion to provide an A output and a first previous A output, the A output proportional to a combination of a current A difference and a first previous A output weighted by a sinusoidal function, less a second previous A output, where the sinusoidal function argument corresponds to a first symbol frequency. Correlating further includes a step of forming a B difference between a current sample of the second symbol and a sample M sample times earlier and operating in a recursive fashion to provide a B output and a first previous B output, the B output proportional to a combination of a current B difference and a first previous B output weighted by a sinusoidal function, less a second previous B output, where the sinusoidal functions argument corresponds to a second symbol frequency. lastly the correlating includes a step of combining weighted versions of the A output, the first previous A output, and the first previous B output to provide a plurality, preferably 13, correlation magnitudes and a further step of comparing the plurality of correlation magnitudes to provide the correlation magnitude, thus the timing error.

Another aspect of the instant invention is an apparatus in a receiver for acquiring a timing reference for a data signal, that includes a receiver front end for receiving a sequence of symbols, and a signal processor programmed to correlate, using a recursive procedure, the sequence of symbols to a predetermined sequence of symbols to provide a correlated magnitude corresponding to a timing error; and adjust a timing reference in accordance with the timing error. The signal processor is additionally preferably programmed to perform the additional procedures discussed above with reference to a method.

More particularly the signal processor within the receiver is arranged and constructed to provide a DTFT corresponding to a sequence of samples, including a current, preferably, last sample, of a signal is disclosed and discussed. This signal processor includes a recursive structure, coupled to the signal and operating on the sequence of samples, for providing an output and a first previous or time delayed output. The output is proportional to a combination of the current, preferably, last sample of the signal and a first previous output weighted by a sinusoidal function, less a second previous output, where the sinusoidal function has an argument that corresponds to an arbitrary frequency. Further included is a combiner coupled to the output and the first previous output for providing a DTFT signal proportional to a DTFT evaluated at the arbitrary frequency for the sequence of samples.

The combiner preferably provides the DTFT signal as a combination of the output and the first previous output weighted in proportion to the sinusoidal function. For the sake of accuracy or required internal dynamic range the signal processor also preferably includes a signal conditioner operating to provide the sequence of samples so as to limit the magnitude of the output. This conditioner preferably phase shifts each sample of an input signal to provide the sequence of samples. This phase shifting is efficiently and effectively accomplished if each sample of the input signal is phase shifted, either positively or negatively, by n×90 degrees or $n\pi/2$ radians, where n is the index of the sample. The sinusoidal function found to be effective when the conditioner is phase shifting by a positive $\pi/2$ radians, is $2\cos(\omega+\pi/2)$ where $\omega$ is a normalized radian frequency equal to $2\pi$ times the arbitrary frequency divided by a sampling frequency for the system. A, similar function with a negative $\pi/2$ factor is used for a negative shift.

This signal processor (see FIG. 2 reference numeral 218) is particularly useful when the sequence of samples are complex samples and the DTFT signal is a complex value. The signal processor or any or all of the requisite elements of the receiver, such as the recursive structures, the combiners, the frequency and timing detectors, and etc. are readily implemented in a digital signal processor executing software readily written by one of ordinary skill in the art. Similarly the signal processor may be implemented all or in part as one or more integrated circuits. In particular the preferred embodiment uses a Motorola DSP56166. This DSP is a 16 bit fixed point processor. This signal processor has numerous advantages over known techniques, such as the so called Goertzel method, including a factor of 2 to 4 times fewer processing steps to provide a DTFT at an arbitrary frequency as well as an inventive technique resulting in minimal dynamic range requirements for intermediate steps. Additionally there is near zero processing latency. When the first signal sample is available processing may begin and as the last signal sample arrives the DTFT is shortly available. These factors together allow the utilization of minimal capability processors or minimal capability of any processor to do, for example, the historically complex task of symbol detection.

One application of the signal processor is a symbol detector arranged and constructed to select a symbol encoded as frequency shift keyed (FSK) modulation from a sequence of samples, including a current, preferably, last sample, of a signal. The symbol detector includes a recursive structure, coupled to the signal and operating on the sequence of samples, for providing an output and a first previous output. The output is proportional to a combination of the current, preferably, last sample of the signal and a first previous output weighted by a sinusoidal function, less a second previous output, where the sinusoidal function has an argument corresponding to a frequency representative of the symbol. Also included is a combiner coupled to the output and the first previous output for providing a DTFT signal proportional to a DTFT evaluated at the frequency representative of the symbol for the sequence of samples.

The symbol detector preferably has certain structures, such as the signal conditioner, and operations that are analogous to the signal processor above described. The symbol detector as the signal processor is particularly advantageous when the sequence of samples are complex samples and the DTFT signal is a complex value. The symbol detector may be advantageously embodied in a DSP or integrated circuit form. While the symbol detector here described is adapted for FSK symbol detection the principals and analogous structure may be used to construct a phase shift keyed symbol detector, quadrature amplitude modulated (QAM) symbol detector, or others by focusing on the phase and amplitude of the DTFT rather than amplitude alone.

The symbol detector preferably includes a magnitude selector if or when one symbol from a finite set is to be selected. The magnitude selector is coupled to the combiner and operates to form a magnitude of the DTFT signal. The recursive structure and the combiner further operate to form a second and so on DTFT signal for a second and so on frequency representative of a second and so on symbol. The magnitude selector further forms a second and so on magnitude of the second, etc. DTFT signal and selects the symbol corresponding to the largest of all of the magnitudes.

Turning to the figures for a better understanding of the inventive principles within the preferred embodiment of the instant invention, FIG. 1 depicts a selective messaging system (100) in overview block diagram format. The system includes a switch, terminal, or controller (103) coupled to a message source (101), such as the Public Switched Telephone Network. The controller (103) is coupled to a selective message transmitter system or base transmitter (105) and provides messages, such as paging messages, and control/scheduling information to this transmitter system. Each base transmitter (one depicted) uses the control scheduling information together with the messages to modulate a radio frequency carrier in accordance with a chosen modulation technique, such as preferably frequency shift keyed (FSK) modulation but equally applicable phase shift keyed (PSK) modulation or quadrature amplitude modulation (QAM), and transmits the messages from an antenna, as a modulated radio frequency carrier, over a, preferably, wireless channel (106) to the selective messaging units (107), such as paging message units (PMU) via their respective antennas. While the two PMUs are shown it is understood that a plurality of such units may exist in actual systems and that each base transmitter will be capable of delivering messages to many such PMUs.

The above description applies to so called one way selective messaging systems where messages are delivered from the base transmitters to the PMUs. In two way systems where messages may originate at the PMUs, either volitional or responsive to a message from the base transmitter, the messaging system will additionally have one or more base receivers (109). In such systems the PMUs (107) transmit a message, such as an acknowledgment (ACK) or status message from their respective antennas over their respective uplink wireless channels (110) to one or more of these base receivers (109) via their antenna (108). The receivers are coupled to the controller (103) as depicted and allow the controller (103) to provide the appropriate base transmitter with a non- acknowledgment (NACK) signal or the like under suitable circumstances.

It is noted that the selective messaging system (100) as depicted is merely an exemplary setting for the instant disclosure and serves to facilitate disclosure and in no way is intended to limit the true spirit and scope of the present invention. Actual systems may include significant additional base transmitters, PMUs, base receivers and may include an overlaying, perhaps satellite based system for maintaining a common time reference at each base transmitter for facilitating such functions as simulcasting a message from multiple base transmitters. The wireless channels (106) or uplink wireless channels (110) may be the same or different radio frequencies depending on the system design, or immediate objective. In any event the instant disclosure deals predominantly with inventive principles applicable, for example, to receivers such as found in the PMUs and preferably the base receiver (109) although these principles may find application in many fields including nearly all communications systems.

Figure 2:
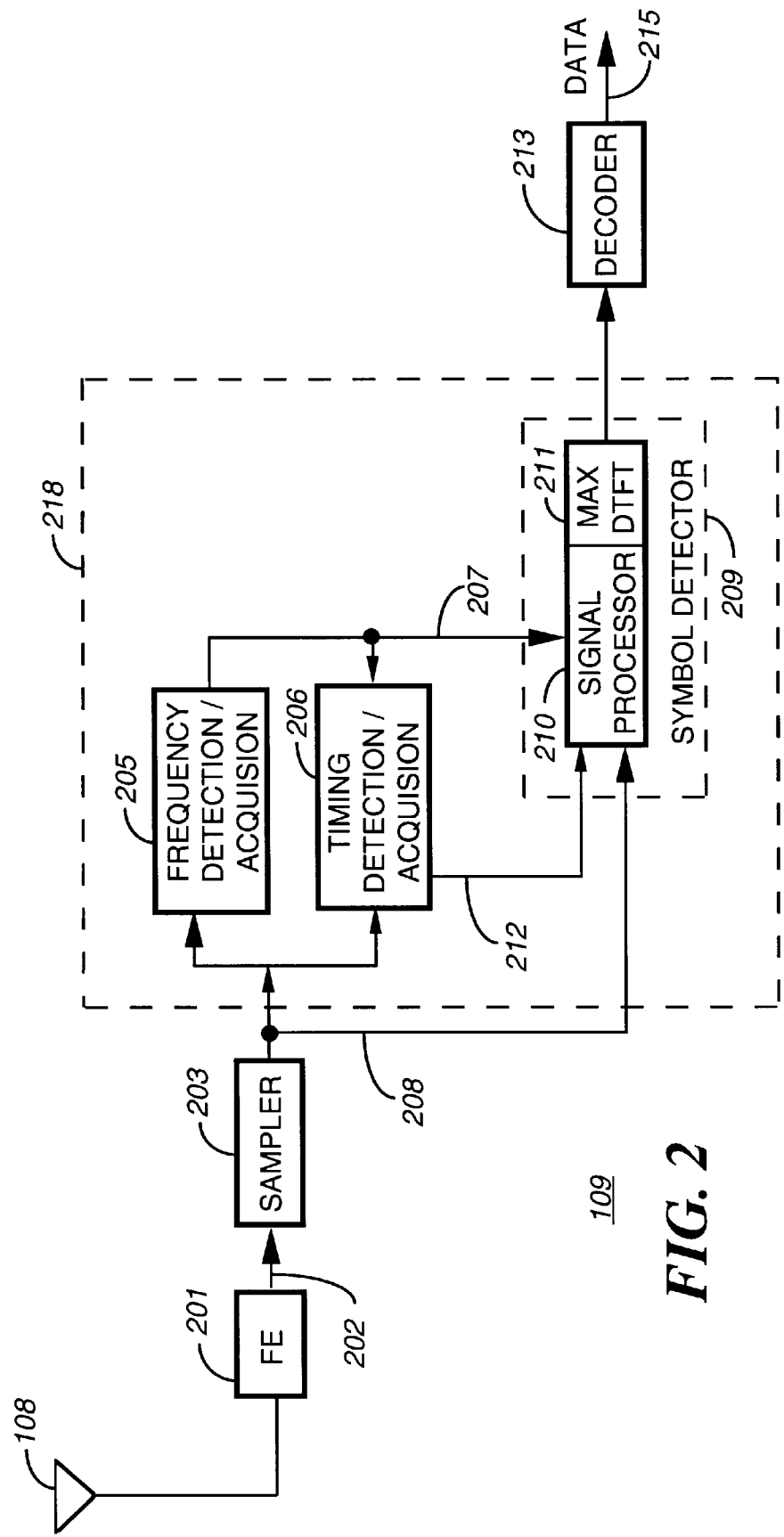
FIG. 2 is a more detailed block diagram of a receiver including a preferred embodiment of a frequency detector, timing detector, and symbol detector suitable for use in the FIG. 1 messaging system.

Thus we focus on the more detailed FIG. 2 block diagram of the receiver (109) wherein like reference numerals refer to like entities. FIG. 2 depicts the antenna (108) coupled to a radio frequency front end (201) where messages from the uplink wireless channel (110) are amplified, filtered, mixed, with a signal from a local oscillator not specifically shown, to a low frequency baseband signal, at output (202). Ideally this low frequency baseband signal may resemble that depicted in exemplary form in FIG. 4. These operations are all in accordance with approaches readily evident to one of ordinary skill in the art.

Figure 4:
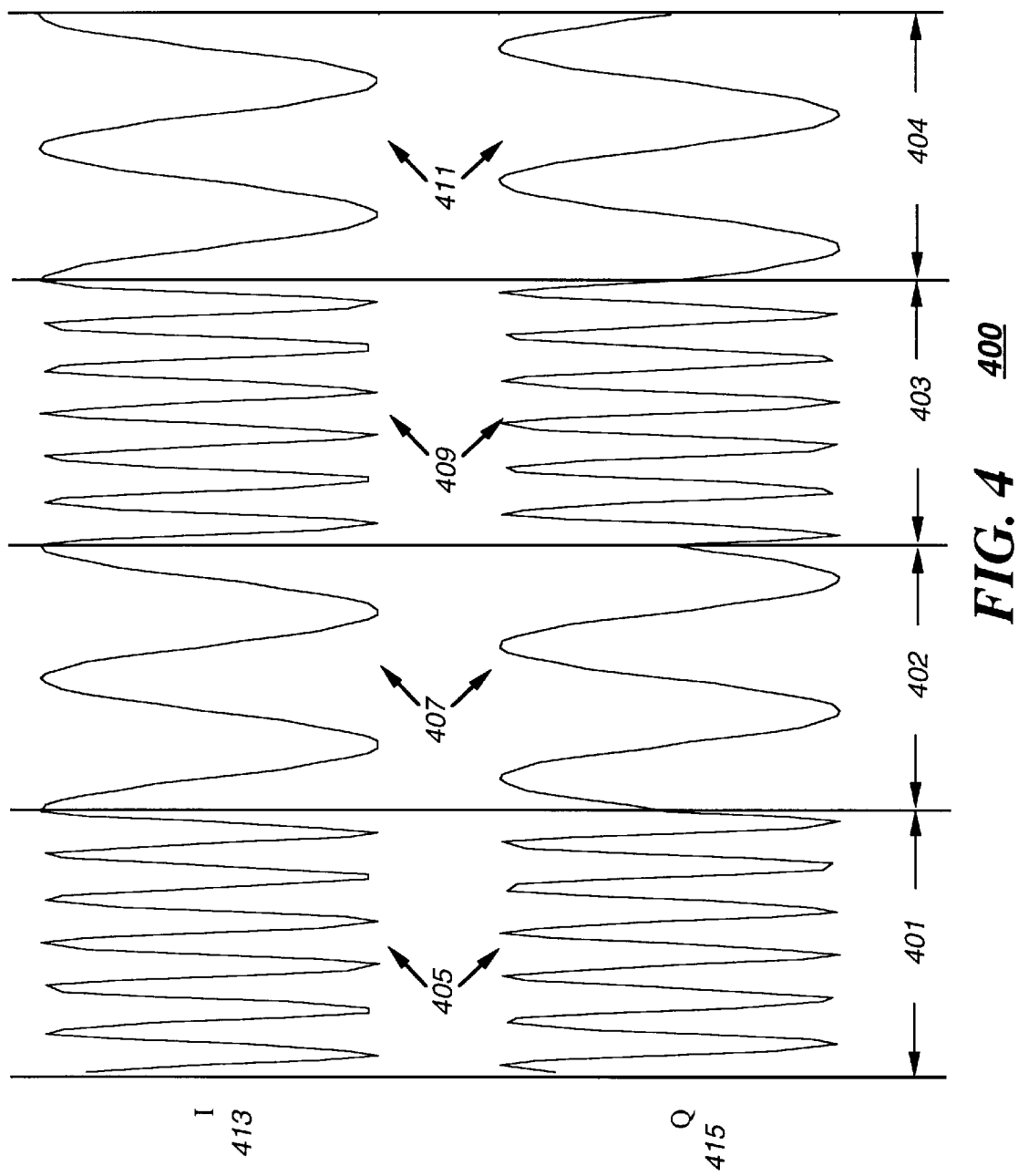
FIG. 4 is a exemplary signal diagram of an FSK baseband signal suited to understanding certain functions within FIG. 2 and FIG. 3.

The FIG. 4 signal depicts a baseband signal (400), specifically 4 symbol periods of a baseband signal, including in phase (I) and quadrature (Q) components, that was FSK modulated with varying frequency signals representative of the four possible symbols, specifically +/−2400 Hz and +/−800 Hz, in the preferred system. Four symbol time periods (401, 402, 403, 404) are shown with time period (401) occupied by a first signal having a first frequency (405), preferably +2400 Hz, representative of a first symbol. Similarly time period (402) is occupied by a second signal having a second frequency (407), preferably +800 Hz, representative of a second symbol. During symbol time period (403) the first frequency repeats but with the opposite sign or phase for the quadrature component yielding a negative frequency signal, that is preferably −2400 Hz and during symbol time (404) the second frequency similarly repeats with an opposite phase or preferably −800 Hz. Each symbol time period depicted in FIG. 4 as in the preferred embodiment is 2.5 milliseconds (ms) in duration. In an alternative preferred embodiment the time duration is 1.25 ms. These symbol time durations correspond, respectively, to an 400 or 300 symbol per second rate and, respectively, 800 and 1600 bits per second (bps) rate as the preferred system encodes 2 bits per symbol.

The output (202) with baseband signal (400) is coupled to a sampler (203) where the baseband signal, both the in phase (I) (413) or real and quadrature (Q) (415) or imaginary components is sampled or converted to a digital signal at the sampling rate of 20,000 times per second. Each sample of the I and Q component is converted by an analog to digital converter (not specifically shown) to a 16 bit digital word. At this sampling rate 50 samples are taken during each symbol time period shown in FIG. 4, thus 50 digital words are generated, or 25 samples for each period in the alternative 1600 bps embodiment. In any event the digital words, as sampled digital data $x_i(n)$, $x_q(n)$, are coupled, at output (208), to a frequency acquisition, timing acquisition, and symbol detection (FATASD) block (FATASD) block 218, the output of which is coupled to a decoder 213 for producing a decoded data message at an output 215. The FATASD block 218 may be viewed as a receiver arranged and constructed to receive a signal using a noncoherent matched filter structure. This receiver is preferably implemented as a signal processor, such as general purpose DSP but may be fashioned from a dedicated integrated circuit or several such dedicated ICs arranged for, in order, acquiring the transmission frequency, acquiring the symbol timing, and detecting or determining symbols within the received signal. All of these tasks are facilitated to a one extent or another by preferably very efficient techniques for providing discrete time Fourier transforms (DTFTs) on the samples of the signal, as is described further herein below in accordance with the present invention. The input to the FATASD block or the signal samples are coupled to a frequency detector or acquisition block (205), a timing detector or acquisition block (206), and a symbol detector (209). The frequency detector (205) is arranged to process a first portion of the signal to provide a frequency error at output (207) as explained further below. This frequency error or reference is coupled to timing detector (206) and symbol detector (209). The timing detector (206) is responsive to the frequency error and arranged to process a second portion of the signal to provide a timing error or timing reference at output (212) as further explained below. This timing error or reference is coupled to symbol detector (209). The symbol detector 209 is responsive to the frequency error and the timing error and arranged to process a symbol portion of the signal to provide a series of detected symbols.

The symbol detector (209) further comprises a signal processor (210) coupled to a maximum DTFT block 211 that operates preferably as a comparator, as well understood, to select the largest magnitude DTFT from among four DTFTs provided by the signal processor 210. The maximum DTFT block 211 provides a series of symbols, one for each symbol time period, or digital representations thereof to the decoder 213. It will be appreciated that, alternatively, the functions of the maximum DTFT block 211 can be performed by the signal processor 210 instead. The decoder 213 then decodes the symbols in accordance with whatever over the air protocol is used, as is well understood in the art, into a data or binary stream at the output 215. As the details of the over the air protocol and decoding are well understood in general and not further relevant to this disclosure no further space will be devoted to them.

Figure 6:
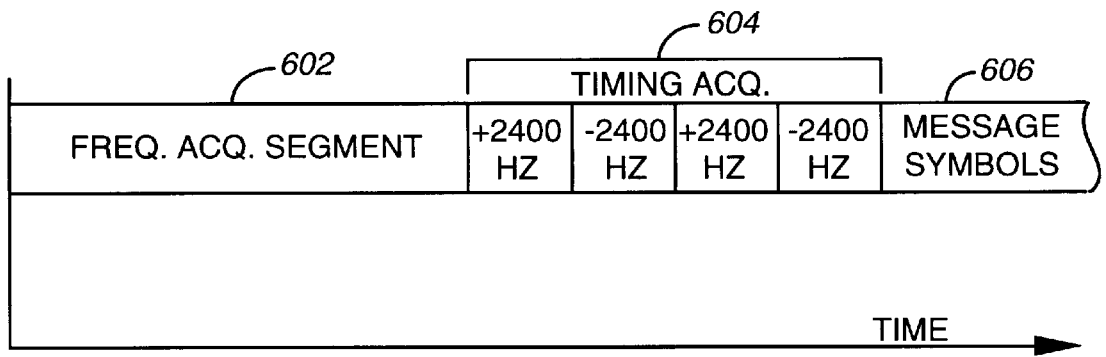
FIG. 6 is a protocol timing diagram depicting the beginning portions of a transmission suited for use in accordance with the present invention.

Preparatory to symbol detection the frequency detector (205) must acquire the transmission frequency or provide the frequency error and the timing detector must similarly acquire the signal timing or timing error or symbol timing. Referring to FIG. 6, a received signal protocol timing diagram 600 depicts the beginning portions of a transmission or the initial information in an information packet in accordance with the present invention. The transmitted signal preferably initially includes a first portion or frequency acquisition segment 602 that is preferably five symbol periods in length. In the preferred protocol this first portion or five symbols is silent carrier and does not have modulation. It is understood that any predetermined modulation pattern may be used for this first portion or frequency acquisition segment.

Following the frequency acquisition segment 602 is a timing acquisition segment 604 comprising preferably four alternating symbols of +2400 Hz, −2400 Hz, +2400, and −2400 Hz deviation. The timing acquisition segment 604 is utilized by the receiver or the timing detector (206) to acquire the symbol timing as described herein further below. The timing acquisition segment 604 is followed by message symbols 606, which are demodulated in accordance with the present invention after frequency and timing acquisition have occurred. Again any predetermined pattern of symbols may be used for the second portion or timing acquisition segment so long as the expected time for change is known.

Frequency acquisition is the first step of the message recovery and timing detection is the second step. If frequency or timing acquisition or detection fails, no matter how sophisticated symbol recovery is, the whole packet fails. Therefore the frequency and timing detectors or acquisition should be designed to be very robust. For practical applications these acquisition functions should also require a reasonable processing power. The preferred acquisition techniques described herein below satisfies all these criteria.

Frequency acquisition block (205) operates to acquire the actual baseband carrier frequency or frequency error, depicted as 0 Hz in representative FIG. 4. In practical systems for various reasons the actual carrier frequency of the transmitted signal and the nominal carrier frequency of the transmitter or the carrier frequency of the transmitter as expected by the receiver will differ and this difference is known as the frequency error. This frequency error in practical receiver, amounts to a frequency translation of the symbol frequencies, such as depicted in FIG. 4. Hypothetically, if the frequency error was 500 Hz, the symbols, depicted in FIG. 4 would be demodulated or recovered as a +2900 Hz, +1300 Hz, −1900 Hz, and −300 Hz signal in, respectively, symbol times (401 402, 403, 404).

The frequency acquisition block (205) selects, as corresponding to a frequency error, a maximum magnitude discrete time Fourier transform (DTFT) from a multiple point, preferably 67 point, DTFT that it calculates at frequencies uniformly spread, preferably every 30 Hz for a resolution of 15 Hz, over the range of possible frequencies that may be observed. In the preferred system this acquisition phase is set to operate during a silent carrier portion of the signal and this range is +/−1000 Hz or a 1000 Hz possible frequency error. After detecting the maximum magnitude DTFT the frequency error $\Delta f$, more specifically normalized frequency error $\Delta\omega = 2\pi\Delta f/f_s$, where $f_s$ is the sampling frequency, preferably 20,000 Hz, is obtained as the frequency error corresponding to the maximum magnitude DTFT. These DTFTs are preferably calculated or determined as described below with reference to the symbol detector. In any event this frequency error is coupled to the timing detector (206) and the symbol detector (209) at output (207) and used as further explained below in the process of timing acquisition or detection and symbol detection or selection.

An alternative technique for frequency detection is described in co-pending application titled METHOD AND APPARATUS FOR DEMODULATING A SYMBOL Ser. No. 08/858,337 which is now U.S. Pat. No. 5,852,638 by Chen et al, having the same filing date, and assigned to the same assignee. This application is hereby incorporated herein by reference. The alternative technique may provide greater accuracy in frequency detection or require less processor resources under some circumstances, such as, low symbol rates, such as 200 symbols per second.

Given the frequency error, the timing detector (206) preferably next acquires the symbol timing. This process is aided by the second portion 604 or timing synchronization pattern that is transmitted following the frequency acquisition segment. The timing synchronization pattern depicted comprises four symbols arranged in a pattern corresponding to +2400 Hz, −2400 Hz, +2400 Hz, and −2400 Hz. The timing detector, preferably correlates only the first three symbols to provide an estimate of the timing error. Briefly, the timing detector calculates a correlation or cross-correlation between the received signal x(n) whose carrier error has been corrected, more particularly a sequence of symbol samples, specifically a sequence of samples corresponding to a predetermined number, preferably three, of symbols plus a number of samples equal to the correlation length, here 13, and a known timing acquisition pattern a(n), more particularly a predetermined sequence of symbol samples representative of the same number of symbols. Preferably, the cross-correlation is performed by a signal processor, such as DSP but alternatively a dedicated IC, operating as a recursive structure and using a fast, recursive technique, as described further herein below. Then the timing detector 206, preferably locates or selects the peak or largest magnitude of the cross-correlations or the largest of the correlated magnitudes. This selected correlated magnitude is associated with a number of sample periods ($\Delta n$) and this corresponds to the timing error in terms of number of sample periods.

The correlation for timing acquisition is to use the first three known symbols, denoted by a(n), of the timing acquisition portion or element (604) to cross-correlate the received signal 25 with carrier or frequency error corrected or compensated, denoted by $x(n)=x_r(n)+jx_i(n)$, available at the output of frequency compensator 801, in a window containing the said three symbols. This window is determined by other rough timing sources, such as GPS. The search window width equals the three symbol length N=3M plus the correlation length $N_R$−1, where M is the symbol length. It is observed that a (n) can be represented by $$a(n)=a_1(n)-a_2(n)+a_3(n)$$

where $$a_1(n) = \begin{cases} e^{j\omega n}, & 1 \le n \le N, \\ 0, & \text{others}, \end{cases}$$

$$a_2(n) = \begin{cases} e^{j\omega n}, & M+1 \le n \le 2M \\ 0, & \text{otherwise} \end{cases}$$

$$a_3(n) = \begin{cases} e^{-j\omega n}, & M+1 \le n \le 2M \\ 0, & \text{otherwise} \end{cases}$$

where $\omega=2\pi f\Delta t$ with f=2400 Hz, $\Delta t=(1/20000)$Sec. For 800 bps M=50 and for 1600 bps, M=25. And the correlation r(n) of a(n) with x(n) can be represented by $$r(n)=r_1(n)-r_2(n)+r_3(n)$$

where $r_1(n)$, $r_2(n)$, and $r_3(n)$ are the correlations of $a_1(n)$, $a_2(n)$, and $a_3(n)$ respectively with the received signal x(n).

The $r_1(n)$, $-r_2(n)+r_3(n)$ can be calculated in a recursive structure described below.

The calculation of $r_1(n)$ can be represented by $$r_1(n)=\hat{r}_1(n)-e^{-j\omega}\hat{r}_1(n-1)$$

where the real and imaginary parts $\hat{r}_{1r}$ (n) and $\hat{r}_{1i}$ (n) of $\hat{r}_1$ (n) are calculated by $$\hat{r}_{1r}(n)=2\cos\omega\hat{r}_{1r}(n-1)-\hat{r}_{1r}(n-2)+\hat{x}_r(n)$$

$$\hat{r}_{1i}(n)=2\cos\omega\hat{r}_{1i}(n-1)-\hat{r}_{1i}(n-2)+\hat{x}_i(n)$$

These equations are functionally implemented by the apparatus of FIG. 8 as shown at 816 and 819 respectively and referred to below collectively as the A output. These are the real and imaginary components of the A output, where $\tilde{x}_r(n)$ and $\tilde{x}_i(n)$ are related to $x_r(n)$ and $x_i(n)$, the real part and imaginary part of the received signal x(n), by $$\hat{x}_r(n) = \begin{cases} x_r(n), & n = 1, 2, ..., N \\ x_r(n) - x_r(n-N), & n = N+1, N+2, ..., N+N_R-1 \end{cases}$$

and $$\hat{x}_i(n) = \begin{cases} x_i(n), & n = 1, 2, ..., N \\ x_i(n) - x_i(n-N), & n = N+1, N+2, ..., N+N_R-1 \end{cases}$$

These $\tilde{x}_r$ (n) and $\tilde{x}_i$ (n) are shown at 804 and 802 in FIG. 8 and described below collectively as the A difference. These are the real and imaginary component of the A difference.

The $-r_2$ (n)+$r_3$ (n) can be calculated by $$-r_2(n)+r_3(n)=2\hat{r}_{23r}(n-1)\sin\omega-j2\hat{r}_{23i}(n-1)\sin\omega$$

where $$\hat{r}_{23r}(n)=2\cos\omega\hat{r}_{23r}(n-1)-\hat{r}_{23r}(n-2)+\tilde{x}_r(n)$$

$$\hat{r}_{23i}(n)=2\cos\omega\hat{r}_{23i}(n-1)-\hat{r}_{23i}(n-2)+\tilde{x}_i(n)$$

These equations are functionally implemented by the apparatus of FIG. 8 as shown at 821 and 825 respectively and referred to below collectively as the B output. These are the real and imaginary components of the B output, where $\hat{x}_r(n)$ and $\hat{x}_i(n)$ are related to $x_r(n)$ and $x_i(n)$, the real part and imaginary part of the received signal x(n), by where $$\tilde{x}_r(n) = \begin{cases} x_r(n), & n = M, M+1, ..., 2M-1 \\ x_r(n) - x_r(n-N), & n = 2M, 2M+1, 2M+N_R-1 \end{cases}$$

and $$\tilde{x}_i(n) = \begin{cases} x_i(n), & n = M, M+1, ..., 2M-1 \\ x_i(n) - x_i(n-N), & n = 2M, 2M+1, ..., 2M+N_R-1 \end{cases}$$

These $\hat{x}_r(n)$ and $\hat{x}_i(n)$ is shown at 804 and 802 in FIG. 8 and described below collectively as the B difference. These are the real and imaginary component of the B difference.

Finally combining the $r_1(n)$, $-r_2(n)+r_3(n)$ into $r(n)$ can be represented by $$\begin{cases} r_r(n) = \hat{r}_{1r}(n) - \hat{r}_{1r}(n-1)\cos\omega - \hat{r}_{1i}(n-1)\sin\omega + 2\hat{r}_{23i}(n-1)\sin\omega \\ r_i(n) = \hat{r}_{1i}(n) - \hat{r}_{1i}(n-1)\cos\omega + \hat{r}_{1r}(n-1)\sin\omega - 2\hat{r}_{23r}(n-1)\sin\omega \end{cases}$$

These equations are the real and imaginary components of a correlation between the received and known signal symbols. They functionally implemented by the apparatus of FIG. 8 and available at 841 and 843, respectively. Below they are collectively referred to as the weighted combination of the A output, the first previous A output, and the first previous B output. In particular the magnitude of these quantities is a correlation magnitude noted below.

Figure 8:
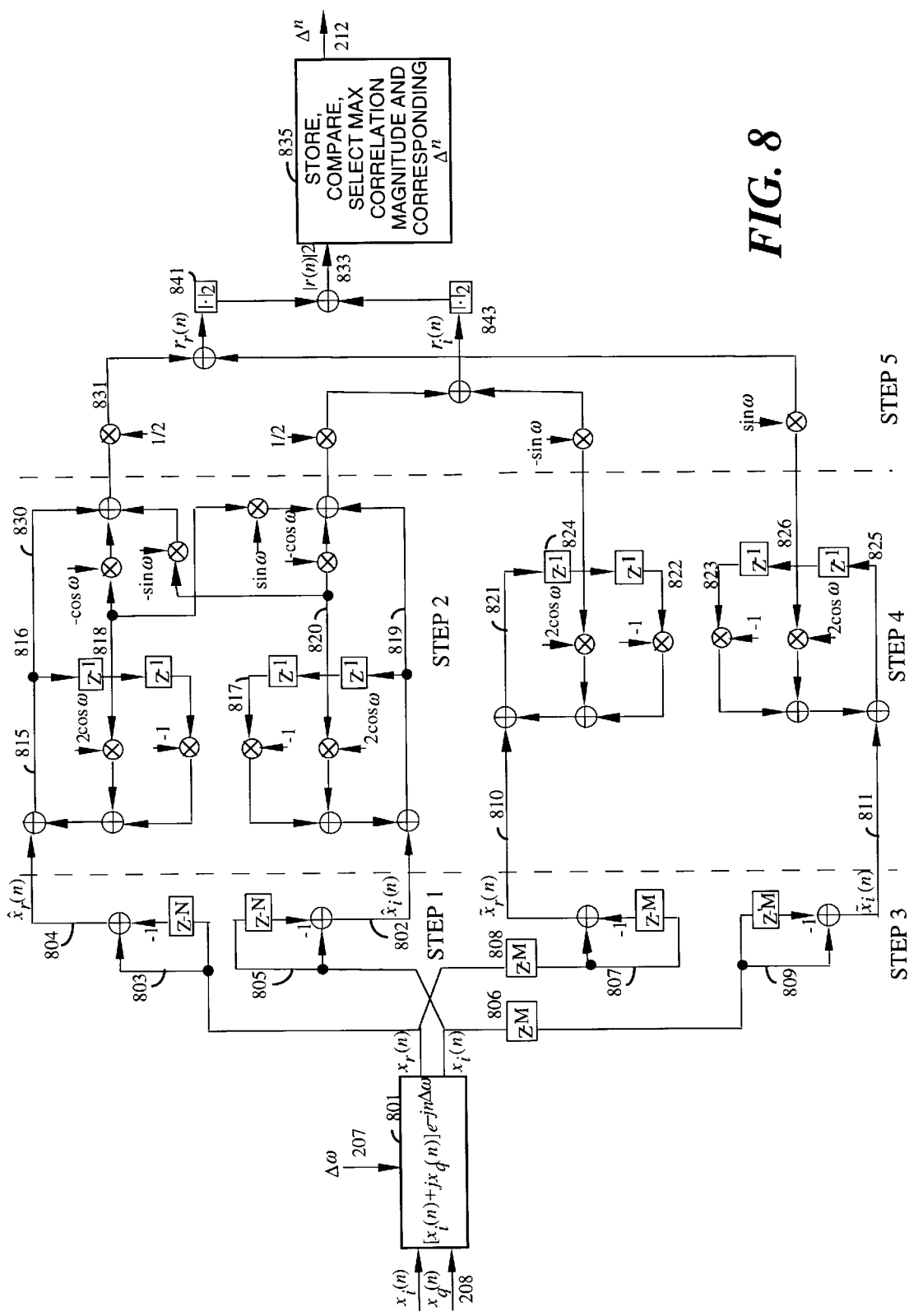
FIG. 8 is a more detailed block diagram of a preferred embodiment of a timing detector in accordance with the present invention.
Figure 9:
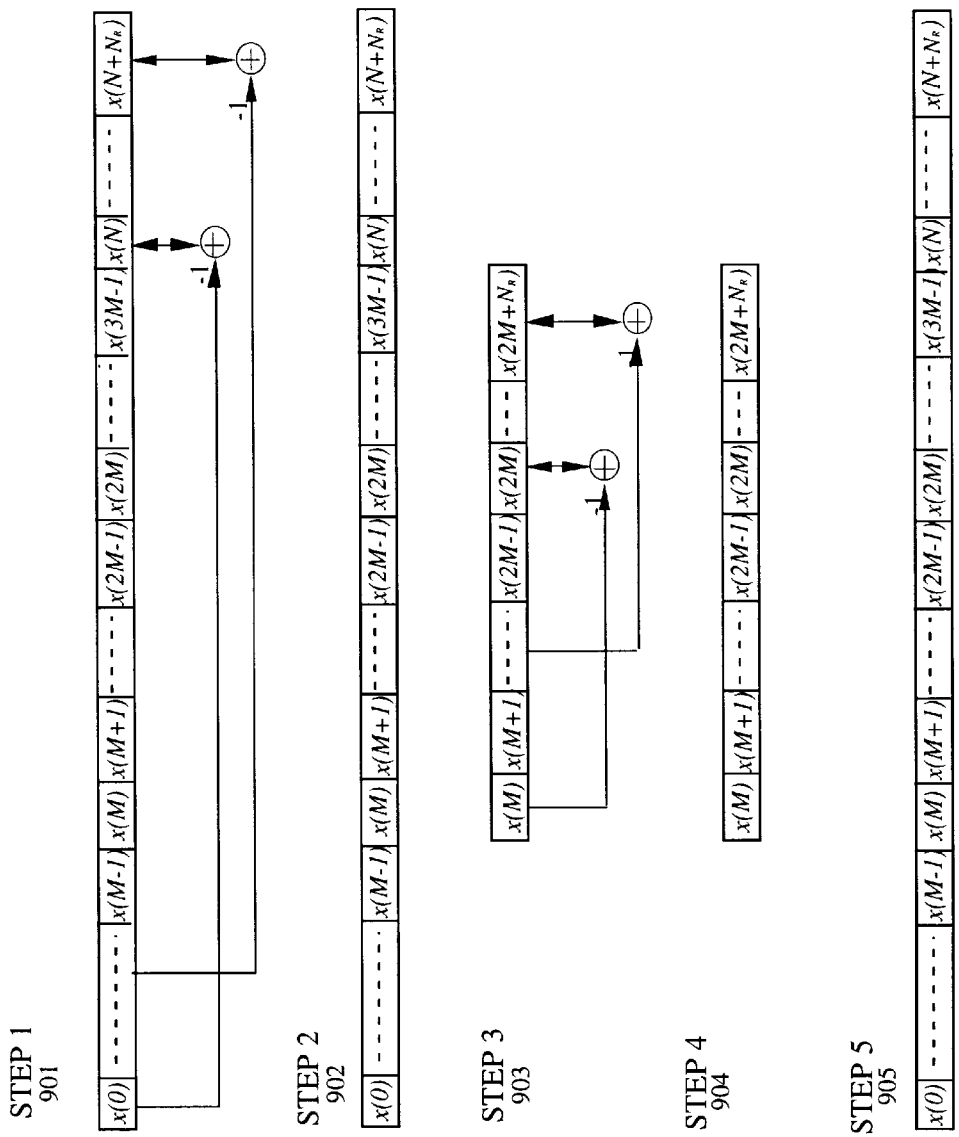
FIG. 9 is a exemplary diagram of register contents suited to enhancing an understanding of the FIG. 9 block diagram.

For a more detailed description of the timing detector and its underlying inventive principles and operation the reader is, referred to the FIG. 8 functional block diagram together with the FIG. 9 exemplary memory register map. It is generally believed that a correlation operation is processor and memory intense. The present invention teaches a method of performing such correlations using minimum processing capability and memory resources as applied, preferably to a timing correction or synchronization problem. As noted above the timing detector is an apparatus in a receiver used to acquire a timing reference or detect a timing error for a signal, such as a data signal. As is well known many data protocols require the receiver to have a time reference or clock that is very closely synchronized to the sending reference or clock.

The apparatus includes a receiver front end for receiving a sequence of symbols, and, preferably, a signal processor programmed to; correlate, using a recursive procedure, the sequence of symbols to a predetermined sequence of symbols to provide a correlated magnitude corresponding to a timing error; and adjust, such as discussed below with reference to the symbol detector 209, a timing reference in accordance with the timing error. As earlier noted the sequence of symbols is sampled with a signal sampler 203 to provide a sequence of symbol samples the signal processor is programmed to correlate the sequence of symbol samples and a predetermined sequence of symbol samples. In particular the signal processor is further programmed to correlate a sequence of symbol samples corresponding to a first symbol, a second symbol and a third symbol, each symbol being M, preferably, 50 samples in duration. These three symbols may be considered to correspond to the first three symbols and there respective frequencies, namely +2400. −2400, and +2400 Hz in the timing acquisition element 604 of FIG. 6.

The complex samples x(n), both in phase and quadrature components, $x_i(n)$, $x_q(n)$ from output 208 are coupled along with $\Delta\omega$ to frequency compensator 801 where a complex multiplication as indicated is undertaken thereby correcting for the frequency error. The outputs $x_r(n)$, $x_i(n)$ are coupled, respectively, to delay and difference blocks 803, 805 and after an M sample time delay 806, 808 to delay and difference blocks 807, 809. The delay and difference block 803 and 805 operate to form, respectively, real and imaginary components of an A difference, available at 804, 802 respectively, between a current sample x(n) and a sample N sample times earlier x(n-N) where N is 3M sample times. These blocks provide $N+N_R$ A differences where $N_R$ is the length of the correlation, preferably, 13 samples. These results and in part the operation are depicted in FIG. 9 at step 1 (901) showing the effect on a memory register.

The delay and difference block 807 and 809 operate to form, respectively, real and imaginary components of a B difference, available at 810, 811 respectively, between a current sample x(n), note this is delayed by M samples from above, and a sample M sample times earlier x(n-M) times. These blocks provide $M+N_R$ B differences. The M sample delay means that these blocks are operating on the second symbol. These results and in part the operation are depicted in FIG. 9 at step 3 (903) showing the effect on a memory register.

The A differences, real and imaginary, are forwarded to a second order recursive block, 815, 817 respectively, which operate in a recursive fashion to provide, for each of the $N+N_R$ A differences, an A output at 816, 819 and a first previous A output at 818, 820. The A output is proportional or equal to a combination of a current A difference and a first previous A output weighted by a sinusoidal function, $2\cos\omega$, less a second previous A output. The argument $\omega$ of the sinusoidal function corresponds to a first symbol frequency, specifically +2400 Hz. Only the last $N_R$ results from this recursive operation are required for the balance of the timing detection. These results and in part the operation of this recursive process is depicted in FIG. 9 at step 2 (902) showing the effect on a memory register.

The B differences, real and imaginary, are forwarded to a second order recursive block, 821, 823 respectively, which operate in a recursive fashion to provide, for each of the $M+N_R$ B differences, a B output at 822, 825 and a first previous B output at 824, 826. The B output is proportional or equal to a combination of a current B difference and a first previous B output weighted by a sinusoidal function, $2\cos\omega$, less a second previous B output. The argument $\omega$ of the sinusoidal function corresponds to a second symbol frequency, specifically 2400 Hz. Again only the last $N_R$ results from this recursive operation are required for the balance of the timing detection. These results and in part the operation of this recursive process is depicted in FIG. 9 at step 4 (904) showing the effect on a memory register.

As depicted the last $N_R$ results, A outputs and first previous A outputs, from the recursive blocks 815, 817 are weighted and combined by the logic block 830. The results from logic block 830 are then weighted and combined along with the last NR results, first previous B outputs, from recursive blocks 821, 823 by the logic function 831 to provide a plurality, preferably 13, correlation magnitudes at 833. These results and in part the operation are depicted at step 5 (905) in FIG. 9 showing the effect on a memory register. These correlation magnitudes are stored, compared, and the largest selected by function 835. The timing error An corresponding to the selected maximum correlation magnitude is then provided at 212 to be used by the symbol detector 209.

Figure 10:
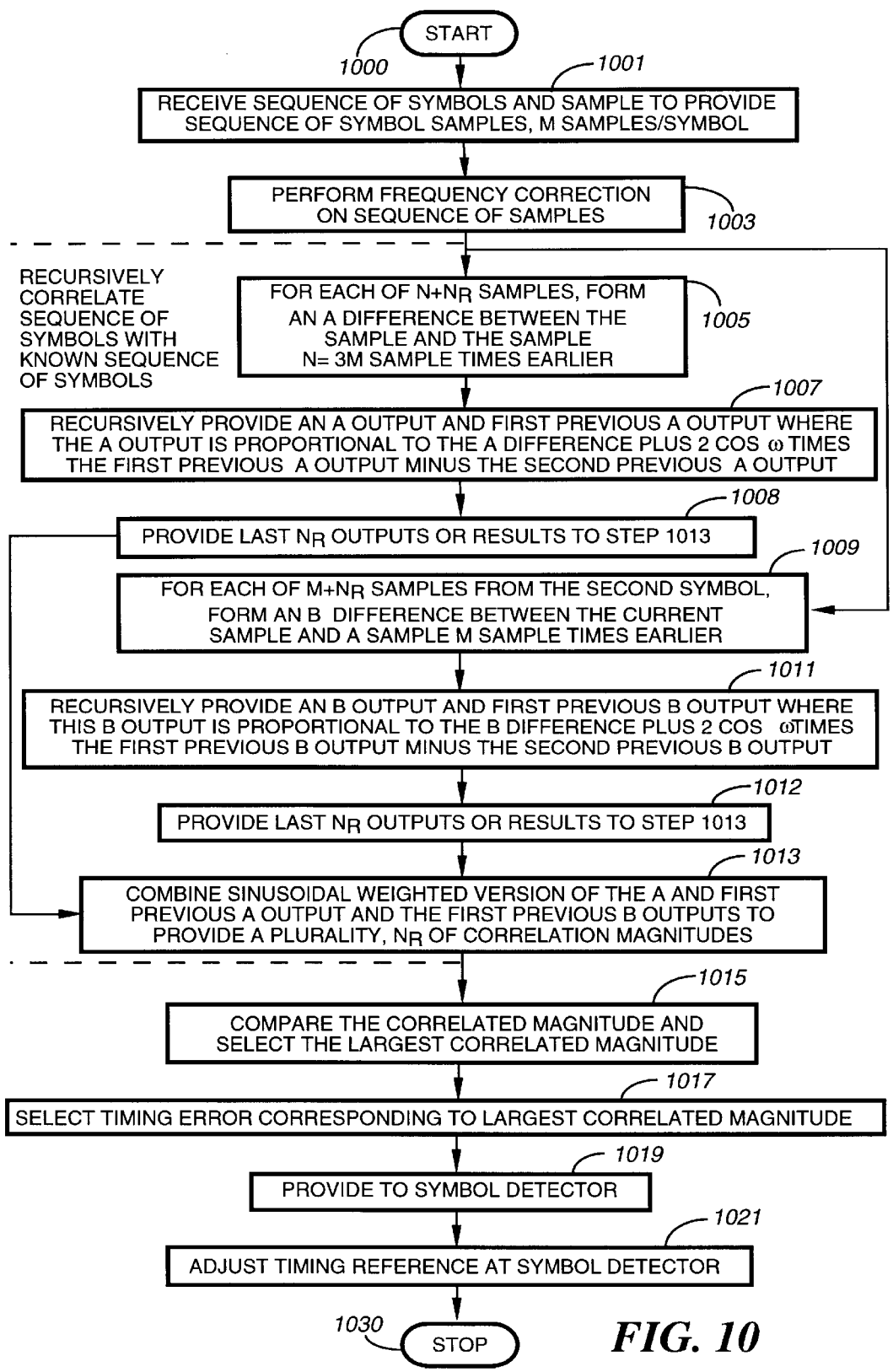
FIG. 10 is a flow chart showing a method of providing a timing error in accordance with the present invention.

Referring to FIG. 10 a method of providing or detecting a timing error or acquiring a timing reference is depicted. Preferably this method is set in a receiver and will facilitate reception of a signal, such as a data signal, by providing means for accurately establishing a timing reference or symbol synchronization. The method starts at 1000 and the first step is 1001 where a sequence of symbols are received and sampled to provide a sequence of symbol samples, at M samples per symbol. Step 1003 is devoted to performing frequency correction on the sequence of samples, by for example multiplying each complex sample x(n) by a complex exponential with an argument of $\Delta\omega$, such as discussed regarding 801. This argument is provided, preferably, by the frequency detector 205 as discussed above.

Steps 1005 through 1013 are directed to correlating, using a recursive procedure, the sequence of symbols after frequency correction to a predetermined sequence of symbols to provide a correlated magnitude corresponding to a timing error. More specifically the sequence of samples from step 1003 is correlated with a known or predetermined sequence of samples or symbol samples representing 3 symbols, specifically a first, second and third symbol, or N samples=3 M samples. Step 1005 forms for each of $N+N_R$ samples an A difference between a current sample and a sample N sample times earlier where N is 3M sample times and $N_R$ is the length of the correlation, preferably, 13 30 samples. At step 1007 a recursive operation provides an A output and a first previous A output for each of $N+N_R$ A differences. The A output is proportional to a combination of a current A difference, from step 1005, and a first previous A output weighted or multiplied by a sinusoidal function, less a second previous A output. The sinusoidal function is, preferably, 2cos ω, where the argument of the sinusoidal function corresponds to a first symbol frequency, preferably +2400 HZ. Step 1008 provides the last $N_R$ results from step 1007) to step 1013.

Step 1009 forms for each of $M+N_R$ samples a B difference between a current sample of said second received symbol and a sample M sample times earlier. Then at step 1011 a recursive operation provides a B output and a first previous B output. The B output is proportional to a combination of a current B difference, from step 1009, and a first previous B output weighted or multiplied by a sinusoidal function, less a second previous B output. The sinusoidal function is, preferably, 2cos ω, where the argument of the sinusoidal function corresponds to a second symbol frequency, preferably −2400 HZ. Step 1012 provides the last $N^R$ results from step 1011 to step 1013 The reader should note that steps 1005 through step 1011 are or may be dealing with complex samples and must be performed for both the real and the imaginary components of the samples.

Step 1013 combines, for each of the $N_R$ inputs from steps 1008 and 1012, sinusoidally weighted versions of the A and first previous A outputs and the first previous B outputs to provide a plurality of correlation magnitudes each corresponding to a number of samples spaced from the present receivers time reference. Step 1013 compares these $N_R$ correlation magnitudes and selects the largest such magnitude. At step 1017 the timing error, Δn, corresponding to this largest magnitude is selected and step 1019 provides this Δn to, preferably, the symbol detector (209) where step 1021 depicts a timing reference being adjusted. In the preferred form with NR equal to 13, Δn can be +/−6, sample times.

The process ends at 1030.

Figure 3:
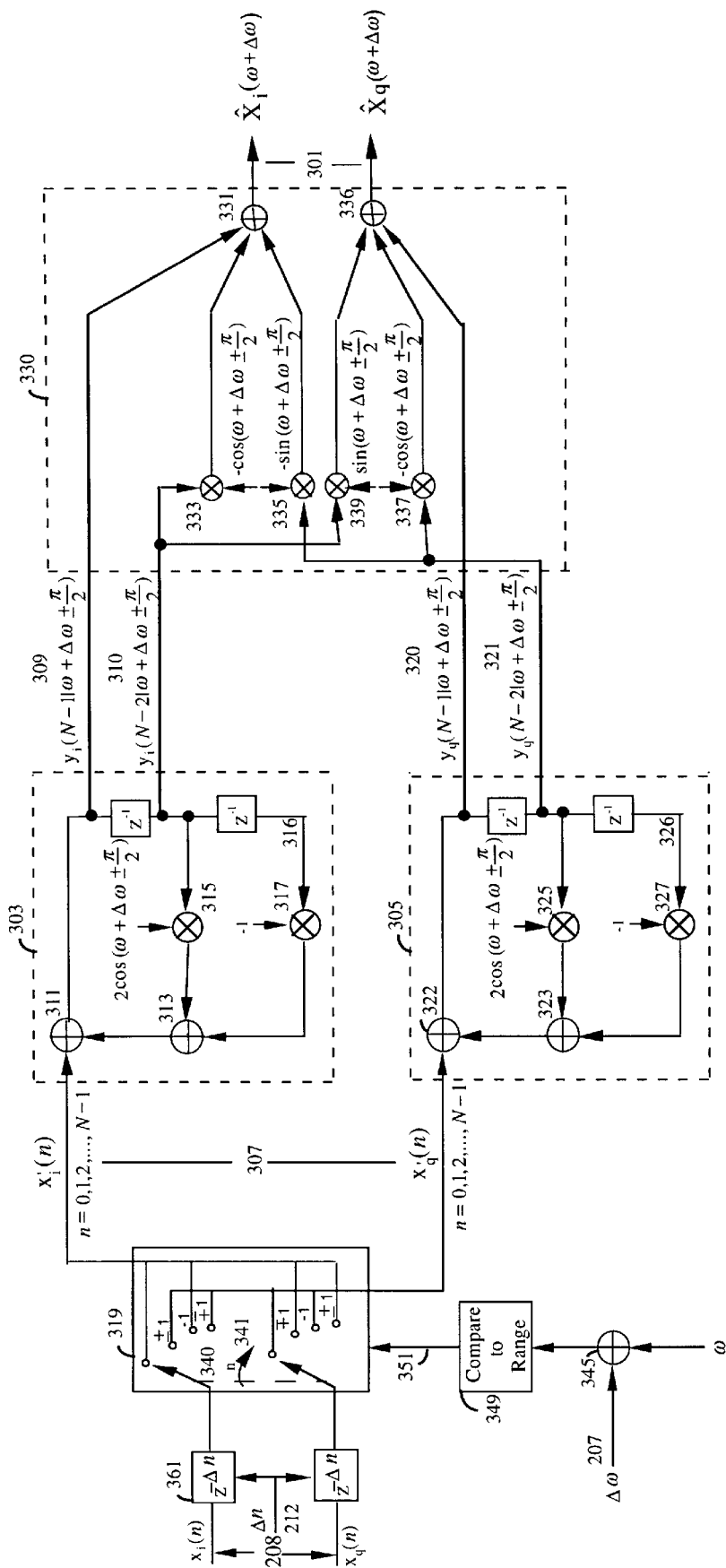
FIG. 3 is a more detailed block diagram of a preferred embodiment of a signal processor in accordance with the instant invention, the signal processor suitable for use in the FIG. 2 symbol detector.

With the frequency error and the timing error determined the symbol detector can correct for Δω and for Δn The frequency error is compensated for by changing the arguments as depicted in the FIG. 3 signal processor block diagram. The timing error is used to adjust the timing reference by modifying the delay using the time delay element 362 in FIG. 3. The symbol detector (209) includes a signal processor (210) and magnitude selector (211) that operates preferably as a comparator, as well understood, to select the largest magnitude DTFT from among all DTFTs, preferably four, provided by the signal processor (210). The magnitude selector (211) provides a series of symbols, one for each symbol time period, or digital representations thereof to a decoder (213). The decoder then decodes these symbols in accordance with whatever over the air protocol is used as is well understood in the art, into a data or binary stream at output (215). As the details of the over the air protocol and decoding are well understood in general and not further relevant to this disclosure no further space will be devoted to them.

For a more detailed understanding of the signal processor (210), the structures depicted and methods utilized in the FIG. 3 embodiments will be explained. Generally FIG. 3 depicts in composite block diagram form 3 embodiments of a signal processor arranged and constructed to provide a discrete time Fourier transform (DTFT), at output (301), corresponding to a sequence of samples, $x'_i(n)$, $x'_q(n)$ (307), n being the sample sequence index and varying from 0, 1, 2, . . . , to N−1, where N, from above, is the number of samples, preferably 50 or alternatively 25 for a symbol time period, including a current, preferably, last sample, $x'_i(N-1)$, $x'_q(N-1)$, of a signal. The three embodiments are distinguished by the algebraic signs (plus (+) and minus (−)) where the preferred embodiment corresponds to the upper sign, a first alternative embodiment corresponds to the lower sign, and a second alternative embodiment substitutes 0 for the π/2 factors in the sinusoidal functions and $x_i(n)=x'_i(n)$, $x_q(n)=x'_q(n)$ all as further explained.

Before continuing with the discussion of FIG. 3, some mathematical background information will be presented. Given a complex discrete time signal defined as:

$$x(n)=x_i(n)+jx_q(n), n=0,1,2,\ldots, N-1$$

and the task of computing a DTFT at an arbitrary frequency, ω, where the DTFT, X(ω), is defined as:

$$X(\omega) = \sum_{n=0}^{N-1} x(n)e^{-j\omega},$$

it can be shown that;

$$X(\omega)=e^{-j(N-1)\omega}y(N-1|\omega)-e^{-jN\omega}y(N-2|\omega),$$

where $$y(N-1|\omega)=y_i(N-1|\omega)+jy_q(N-1|\omega)$$

$$y(N-2|\omega)=y_i(N-2|\omega)+jy_q(N-2|\omega)$$

and $$y_i(n|\omega)=2\cos\omega y_i(n-1|\omega)-y_i(n-2|\omega)+x_i(n)$$

$$y_q(n|\omega)=2\cos\omega y_q(n-1|\omega)-y_q(n-2|\omega)+x_q(n)$$

The signal processor includes a recursive structure including a first recursive structure (303) and, when the signal is complex, a second recursive structure (305), that is coupled to the signal, specifically and respectively the sequence of samples $x'_i(n)$, $x'_q(n)$. The recursive structure (303) operates on the real part of the sequence of samples (307) to provide an output (309) designated $y_i(N-1|\omega+\Delta\omega\pm\pi/2)$ and a first previous output (310) designated $y_i(N-2|\omega+\Delta\omega\pm\pi/2)$. The output is proportional, preferably equivalent, to a combination, such as an algebraic sum as provided by adders (311, 313), of the current and, preferably, last sample of the signal, $x'_i(N-1)$, and the first previous output (310) weighted at multiplier (315) by a sinusoidal function, less (indicated by multiplying by −1 at multiplier (317)) a second previous output at (316).

Analogously the second recursive structure (305) operates on the imaginary part of the sequence of samples (307) to provide an output (320) designated $y_q(N-1|\omega+\Delta\omega\pm\pi/2)$ and a first previous output (321) designated $y_q(N-2|\omega+\Delta\omega\pm\pi/2)$. The output is proportional, preferably equivalent, to a combination, such as algebraic sum as provided by adders 322, 323), of the current and, preferably, last sample of the signal, $x'_q(N-1)$, and the first previous output (322) weighted at multiplier (325) by a sinusoidal function, less (indicated by multiplying by −1 at multiplier (327)) a second previous output at (326).

The sinusoidal function is, in its simplest form preferably, 2 cos(ω) and has an argument corresponding to an arbitrary frequency, $\omega=2\pi f/f_s$, where f is the arbitrary frequency and $f_s$ is the sampling frequency, preferably 20,000. This function becomes $2\cos(\omega\pm\pi/2)$ when a preferred form of a signal conditioner (319), later explained, is provided and enabled. The sinusoidal function as depicted and preferred is 2cos (ω+Δω±π/2) when the frequency error, Δω, from output (207) is nonzero and the signal conditioner is used.

Further included in the signal processor (210) is a combiner (330) that is coupled to the output (309) and the first previous output (310) and when the signal is complex the output (320) and first previous output (321) for providing, at output (301), a DTFT signal,$\hat{X}_i(\omega+\Delta\omega) +j\hat{X}_q(\omega+\Delta\omega)$. This DTFT signal may be shown to be proportional, preferably same magnitude but phase shifted from a DTFT evaluated at the arbitrary frequency for the sequence of samples x'$_i$(n), x'$_q$(n) (307).

More specifically an adder (331) combines the output (309) with the first previous output (310) multiplied, at multiplier (333), by $-\cos(\omega+\Delta\omega\pm\pi/2)$, and, when the sequence of samples is complex, the first previous output (321) multiplied, at multiplier (335), by $-\sin(\omega+\Delta\omega\pm\pi/2)$ to provide $\hat{X}_i(\omega+\Delta\omega)$. Similarly, $\hat{X}_q(\omega+\Delta\omega)$ is produced by adder (336) combining the output (320) with the first previous output (321) multiplied, at multiplier (337), by $-\cos(\omega+\Delta\omega\pm\pi/2)$, and the first previous output (310) multiplied or weighted, at multiplier (339), by $+\sin(\omega+\Delta\omega\pm\pi/2)$. From the algebraic signs it is clear that the adders very often are finding a difference between two inputs as weighted.

It should be noted that while it is preferable that the recursive structures operate on all N samples before the outputs and first previous outputs are combined to yield the DTFT signal the signal processor may provide completely satisfactory results if less than all N samples are used. For example, 40 or less of the 50 samples may well be sufficient to provide a reliable estimate of which of four different symbols is present in a given symbol time period, particularly under strong signal conditions.

The signal processor may additionally include a signal conditioner (319) that operates on the sampled digital data x$_i$(n), x$_q$(n) from output (208) (sequential data sequence) to provide the sequence of samples (307) so as to limit the magnitude of the output (309, 320) and first previous outputs (310, 321). The signal conditioner (319), preferably, phase shifts each sample of an input signal, the sampled data signal, to provide the sequence of samples (307). Due to the recursive nature of the recursive structures (303, 305) intermediate results at the outputs such as output (309) may get quite large depending on the characteristics of the input data and more importantly the value of the argument for the sinusoidal function, specifically cosign function. In particular when this argument approaches either 0 or π the cosign function approaches a value of ±1 and by observation the outputs, such as output (309) will tend to increase in size dramatically. When the dynamic range of the recursive structure is constrained such as when using a fixed point DSP implementation this may result in significant inaccuracies in the final DTFT signal.

This phase shift may be any amount but three particular cases each having certain advantageous attributes will be considered. If the magnitude of the normalized radian frequency, ω, or more specifically corrected normalized radian frequency ω+Δω is not close to 0 or π, but rather lies within a range of approx. 0.25π to 0.75π then a phase shift of zero is typically acceptable. A phase shift of zero corresponds to not having the signal conditioner (319) or disabling it by insuring that a commutating switch (340) does not operate but rather directs each data sample x$_i$(n), X$_q$(n) pair to the recursive structures without modification. This corresponds to the switch (340) staying in the position depicted.

It has been further discovered that a phase shift of ±π/2 is particularly advantageous from a computational efficiency perspective. While preferably a positive π/2 shift is employed a negative π/2 shift works equally well, albeit is implemented differently as depicted by FIG. 3. In any event this phase shift amounts to multiplying each data sample by $e^{\pm jn\pi/2}$. Those of ordinary skill will recognize this is a computationally efficient transform of the data samples, reducing to a routing or algebraic sign change only.

For a positive π/2 shift and n=0, 1, 2, 3, 4, 5, . . . x'$_i$(n)=x$_i$(0), $-x_q$(1),$-x_i$(2), x$_q$(3), x$_i$(4), $-x_q$(5) . . . Similarly, x'$_q$(n)=x$_q$(0), x$_i$(1), $-x_q$(2), $-x_i$(3), x$_q$(4), $-x_q$(5), . . . For a negative π/2 shift x'$_i$(n)=x$_i$(0), x$_q$(1), $-x_i$(2), $-x_q$(3), x$_i$(4), $-x_q$(5), . . . and x'$_q$(n)=x$_q$(0), $-x_i$(1), $-X_q$(2), x$_i$(3), x$_q$(4), $-x_i$(5) . . . This corresponds to the commutating switch driven by the time index n cycling every four counts in the direction indicated by the arrow (341) where the algebraic sign for each branch of the switch is selected such that a positive π/2 shift corresponds to the upper sign, when two signs are provided, and a negative π/2 shift corresponds to the lower sign where two signs are given.

At this point it may be useful to review the operation of the FIG. 3 signal processor. Generally a signal in sampled data form, x$_i$(n)+jx$_q$(n), n =0, 1, 2, 3, . . . , N−1 is coupled to the signal conditioner (319). Suppose the DTFT magnitude of a signal having an arbitrary frequency f, such as nominally 2400 Hz, is required. The signal processor (210) adds, at adder (345), this arbitrary frequency, specifically the normalized frequency, 2π×2400/20000=0.24π to the frequency error Δω at output(207), suppose this is 1000 Hz or normalized 0.π, for a total of 3400 Hz or 0.34π.

Since this falls within the range of 0.25π to 0.75π, as determined by comparator (349) the signal need not be conditioned, so the conditioner is disabled via output (351), and the signal is thus routed, sample by sample, directly to the recursive structures (303, 305). The sinusoidal functions or processing coefficients or constants, cos(0.34π) and sin (0.34π) (Note: there is no π/2 shift) are determined by calculation or lookup table to be 0.48175 and 0.87631 respectively. The recursive structures, preferably, process all N samples, here 50 samples, and after each sample including the N$^{th}$ sample, specifically x$_i$(N−1)+jx$_q$(N−1), provides the outputs (309, 320) and the first previous outputs (310, 321). The combiner (330) combines as above explained these outputs and first previous outputs with one last sequence of multiplies and adds and provides the DTFT signal, $\hat{X}_i(\omega+\Delta\omega) +j\hat{X}_q(\omega+\Delta\omega)$.

This DTFT signal is proportional to a DTFT evaluated at the arbitrary frequency of 2400 Hz or after including the frequency error of 1000Hz, 3400 Hz for this sequence of samples. The DTFT signal may be shown to be proportional in amplitude to a DTFT for this 3400 Hz signal component but may vary in phase from the true DTFT. This variation results from certain simplifications that have been taken advantage of in the combiner (330). These simplifications are applicable when the primary interest is a frequency dependent amplitude or power in a signal and the phase information is not required. In the preferred embodiment, the DTFT signal is coupled to the magnitude selector (211) where the real and imaginary components are squared and added to find the magnitude or power of the 3400 Hz signal, specifically the power corresponding to a 2400 Hz symbol.

For a symbol detector using this or a form of this signal processor and further including the magnitude detector operating to form a magnitude of the DTFT signal, the above process using the recursive structure and the combiner is repeated to form a second DTFT signal for a second frequency corresponding to a second symbol, such as −2400 Hz. The magnitude selector further forms a second magnitude of the second DTFT signal and selects the symbol corresponding to the larger of the two magnitudes. More specifically in the preferred embodiment having 4 different FSK symbols the above process is repeated for +800 Hz, −800 Hz, and −2400 Hz symbols after which a comparison of all magnitudes with one each corresponding to each possible symbol allows for one symbol to be selected, thus detected.

Figure 5:
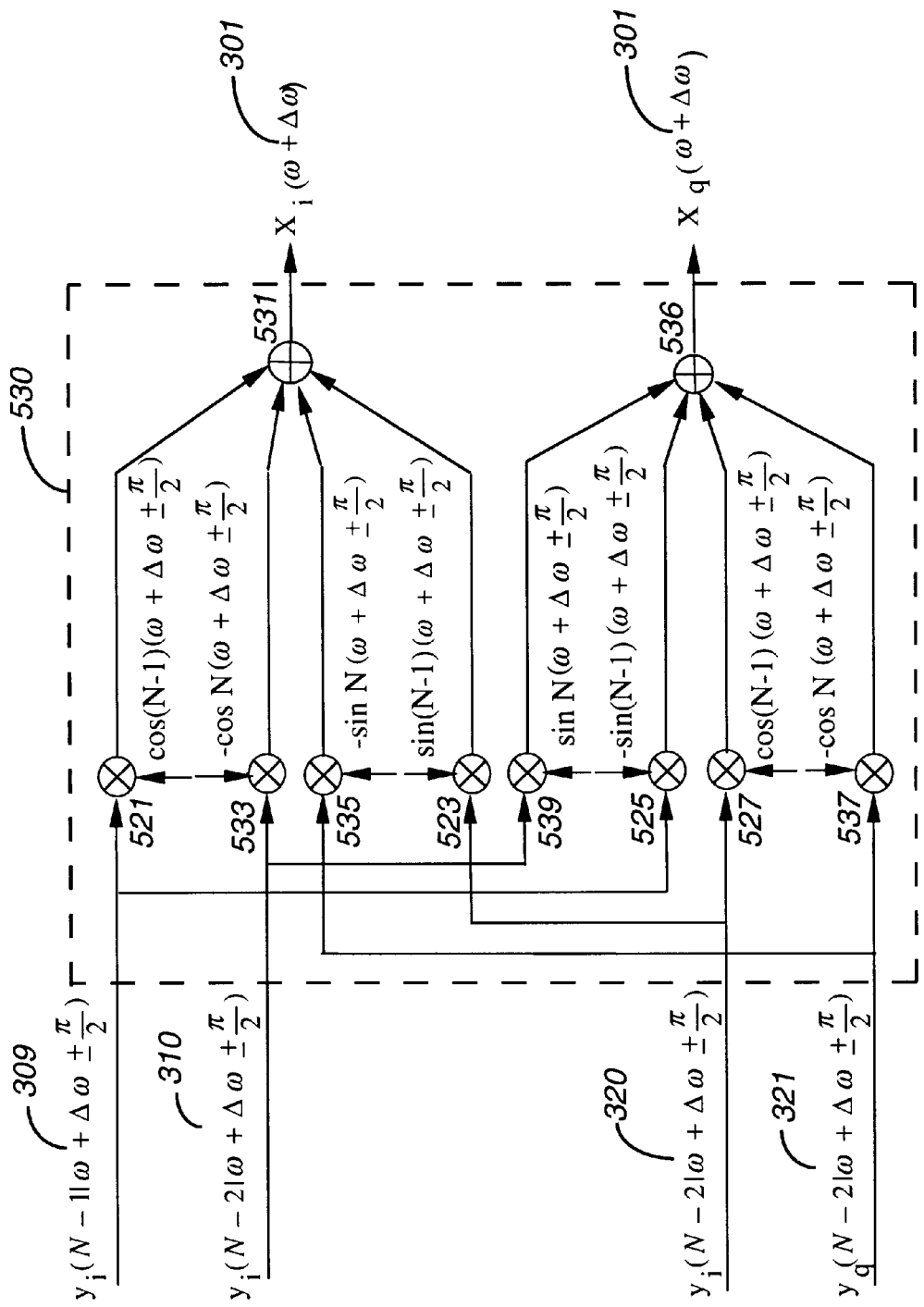
FIG. 5 is an alternative embodiment of a portion of the FIG. 3 signal processor.

Referring to FIG. 5 an alternative embodiment of a combiner (530) is depicted. This combiner is suitable for use as a substitute for the combiner (330) and has like inputs, namely the outputs (309, 320) and the first previous outputs (310, 321). The combiner (530) however provides, at output (301), a DTFT signal, $X_i(\omega+\Delta\omega)+jX_q(\omega+\Delta\omega)$, that has accurate phase and magnitude information. This combiner (530) would be required and useful in PSK or QAM systems where symbol detection requires the phase information, specifically $\tan^{-1}[X_q(\omega+\Delta\omega)/X_i(\omega+\Delta\omega)]$. QAM systems ordinarily require both phase and magnitude, specifically $[X_i(\omega+\Delta\omega)^2+X_q(\omega+\Delta\omega)^2]^{1/2}$. Due to practical difficulties, specifically extensive calculations, most practitioners will try to use the squared magnitude when feasible.

More specifically an adder (531) combines the output (309) weighted or multiplied, at multiplier (521), by $\cos(N-1)(\omega+\Delta\omega\pm\pi/2)$ with the first previous output (310) multiplied, at multiplier (533), by $-\cos N((\omega+\omega\pm\pi/2)$, and, when the sequence of samples is complex, the output (320) multiplied, at multiplier (523), by $\sin(N-1)(\omega+\Delta\omega\pm\pi/2)$, along with the first previous output (321) multiplied, at multiplier (535), by $-\sin N(\omega+\omega\pm\pi/2)$, to provide $X_i(\omega+\Delta\omega)$, the real or in phase portion of the DTFT signal. Similarly, $X_q(\omega+\Delta\omega)$, the imaginary or quadrature portion of the DTFT signal, is produced by adder (536) combining the output (320) multiplied, at multiplier (527), by $\cos(N-1)(\omega+\Delta\omega\pm\pi/2)$ with the first previous output (321) multiplied, at multiplier (537), by $-\cos N(\omega+\Delta\omega\pm\pi/2)$, and the output (309) multiplied, at multiplier (525), by $-\sin(N-1)(\omega+\Delta\omega\pm\pi/2)$ along with the first previous output (310) multiplied or weighted, at multiplier (539), by $\sin N((\omega+\Delta\omega\pm\pi/2)$.

Figure 7:
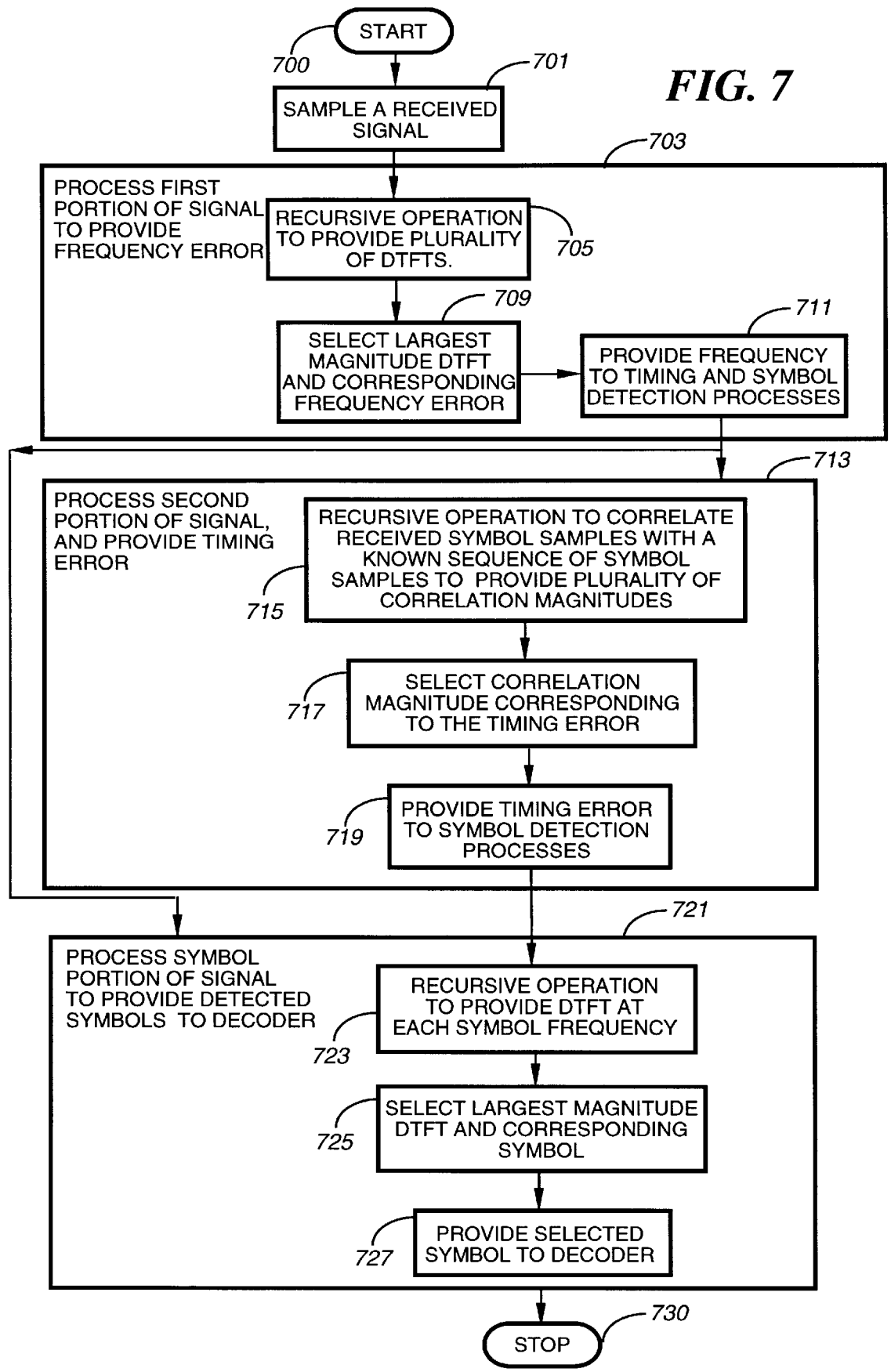
FIG. 7 is a flow chart depicting a method of receiving a signal in accordance with the present invention.

Referring to FIG. 7 a method or process of receiving a signal, set in a receiver arranged as a noncoherent matched filter structure, will be described. The method starts at 700 and then step 701 samples a received signal and provides a corresponding sequence of samples to subsequent steps of the method.

Next step 703 processes a first portion, such as 602, of the signal or samples of the signal to provide a frequency error. Step 705 through step 711 is included in step 703. Step 705 operates in a recursive fashion to provide a plurality of DTFT signals, each preferably spaced across a range of possible frequency errors. Step 709 then selects the largest DTFT signal from the plurality and a corresponding frequency error, for example 500 Hz. Step 711 provides this frequency error to the timing and symbol detection steps of the process, respectively, 713, 721.

Step 713, responsive to the frequency error, processes, a second portion, such as 604, of the signal or corresponding sequence of samples to provide a timing error to the symbol detection process at step 719. Step 721 then, responsive to the frequency error and timing error, processes the symbol portion, such as 606, of the signal to provide detected symbols. Step 721 includes steps 723, 725, and 727. Step 723 operates recursively on the signal or corresponding sequence of samples to provide a DTFT at each symbol frequency, after which step 725 selects the largest magnitude DTFT and a corresponding symbol. This symbol is then provided, at step 727, to the decoder. The process ends at 730.

It will be appreciated by those of ordinary skill in the art that the apparatus and methods disclosed provide various inventive techniques for receiving a signal or signal processing such as timing error detection or timing acquisition. The receiver or signal processor structure and methods discussed have improved computational efficiency significantly over known techniques, and when used as a timing error detector with other processes provided a receiver with a sensitivity very close to the theoretical level. Specifically the alternative approach of calculating a correlation compared to this timing error detector is 75 times more computationally burdensome This has been done without otherwise burdening processing resources. These inventive structures and methods may be readily and advantageously employed in a messaging system, messaging receiver, or other communications devices or system so as to allow the use of lower cost processors in such systems. Hence, the present invention, in furtherance of satisfying a long-felt need of messaging systems and receivers allows a lower cost processor or fewer processing resources to be used and additionally readily facilitates, for example, low power consumption portable receivers by providing methods and apparatus for signal processing, such as frequency and timing error detection or symbol detection that are practical to implement from a physical, economic and power source perspective.

It will be apparent to those skilled in the art that the disclosed invention may be modified in numerous ways and may assume many embodiments other than the preferred forms specifically set out and described above. Various examples would include using different recursive apparatus or methods for timing detection or other methods and techniques for frequency detection or symbol recovery or detection. Accordingly, it is intended by the appended claims to cover all modifications of the invention which fall within the true spirit and scope of the invention.

What is claimed is:

1. A method in a receiver for detecting a timing error for a data signal, comprising the steps of:

receiving a sequence of symbols;

correlating, using a recursive procedure, said sequence of symbols to a predetermined sequence of symbols to provide a correlation magnitude corresponding to a timing error; and adjusting a timing reference in accordance with said timing error.

2. The method of claim 1 further including a step of sampling said sequence of symbols to provide a sequence of symbol samples and wherein said step of correlating is performed between said sequence of symbol samples and a predetermined sequence of symbol samples.

3. The method of claim 2 wherein said step of correlating is performed on a sequence of symbol samples corresponding to a first symbol, a second symbol and a third symbol, each symbol being M samples in duration.

4. The method of claim 3 wherein said step of correlating further includes a step of forming an A difference between a current sample and a sample N sample times earlier where N is 3M sample times.

5. The method of claim 4 wherein said step of correlating further includes a step of operating in a recursive fashion to provide an A output and a first previous A output, said A output proportional to a combination of a current A difference and a first previous A output weighted by a sinusoidal function, less a second previous A output, said sinusoidal function having an argument corresponding to a first symbol frequency.

6. The method of claim 5 wherein said step of correlating further includes a step of forming a B difference between a current sample of said second symbol and a sample M sample times earlier.

7. The method of claim 6 wherein said step of correlating further includes a step of operating in a recursive fashion to provide a B output and a first previous B output, said B output proportional to a combination of a current B difference and a first previous B output weighted by a sinusoidal function, less a second previous B output, said sinusoidal function having an argument corresponding to a second symbol frequency.

8. The method of claim 7 wherein said step of correlating further includes a step of combining weighted versions of said A output, said first previous A output, and said first previous B output to provide a plurality of correlation magnitudes and a further step of comparing said plurality of correlation magnitudes to provide said correlation magnitude, thus said timing error.

9. An apparatus in a receiver for acquiring a timing reference for a data signal, the apparatus comprising:

a receiver front end for receiving a sequence of symbols, and a signal processor programmed to;
correlate, using a recursive procedure, said sequence of symbols to a predetermined sequence of symbols to provide a correlation magnitude corresponding to a timing error; and
adjust a timing reference in accordance with said timing error.

10. The apparatus of claim 9 further including a signal sampler for sampling said sequence of symbols to provide a sequence of symbol samples and wherein said signal processor is programmed to correlate said sequence of symbol samples and a predetermined sequence of symbol samples.

11. The apparatus of claim 10 wherein said signal processor is further programmed to correlate a sequence of symbol samples corresponding to a first symbol, a second symbol and a third symbol, each symbol being M samples in duration.

12. The apparatus of claim 11 wherein said signal processor is further programmed to form an A difference between a current sample and a sample N sample times earlier where N is 3M sample times.

13. The apparatus of claim 12 wherein said signal processor is further programmed to operate in a recursive fashion to provide an A output and a first previous A output, said A output proportional to a combination of a current A difference and a first previous A output weighted by a sinusoidal function, less a second previous A output, said sinusoidal function having an argument corresponding to a first symbol frequency.

14. The apparatus of claim 13 wherein said signal processor is further programmed to form a B difference between a current sample of said second symbol and a sample M sample times earlier.

15. The apparatus of claim 14 wherein said signal processor is further programmed to operate in a recursive fashion to provide a B output and a first previous B output, said B output proportional to a combination of a current B difference and a first previous B output weighted by a sinusoidal function, less a second previous B output, said sinusoidal function having an argument corresponding to a second symbol frequency.

16. The apparatus of claim 15 wherein said signal processor is further programmed to combine weighted versions of said A output, said first previous A output, and said first previous B output to provide a plurality of correlation magnitudes and a further to compare said plurality of correlation magnitudes to provide said correlation magnitude, thus said timing error.

* * * * *